United States Patent
Hashimoto

(10) Patent No.: US 8,331,786 B2
(45) Date of Patent: Dec. 11, 2012

(54) TRANSMISSION METHOD OF WDM LIGHT AND WDM OPTICAL TRANSMISSION SYSTEM

(75) Inventor: Naoki Hashimoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 558 days.

(21) Appl. No.: 12/618,854

(22) Filed: Nov. 16, 2009

(65) Prior Publication Data
US 2010/0150550 A1 Jun. 17, 2010

(30) Foreign Application Priority Data
Dec. 16, 2008 (JP) ................. 2008-319372

(51) Int. Cl.
*H04J 14/02* (2006.01)
(52) U.S. Cl. ............ 398/81; 398/79; 398/85; 398/158; 398/159; 398/147; 398/149; 398/201; 385/24; 385/37; 385/27; 385/123
(58) Field of Classification Search .......... 398/79, 398/81, 147, 148, 149, 158, 159, 160, 85, 398/33, 34, 38, 135, 136, 192, 193, 194, 398/195, 196, 197, 198, 187, 188, 183, 201, 398/212, 202, 207, 208, 214, 186; 385/24, 385/37, 27, 123
See application file for complete search history.

(56) References Cited

U.S. PATENT DOCUMENTS
7,068,943 B2 * 6/2006 Korolev et al. ............... 398/148
7,813,648 B2 * 10/2010 Mahgerefteh et al. ........ 398/158
2007/0196110 A1 8/2007 Mikkelsen et al.

OTHER PUBLICATIONS

B., Mikkelsen et al., "Partial DPSK with excellent filter tolerance and OSNR sensitivity",*Electronics Letters*, 2006, vol. 42, No. 23 Nov. 9, 2006.
Glenn, Baxter et al., "Highly Programmable Wavelength Selective Switch Based on Liquid Crystal on Silicon Switching Elements",*Optical Fiber Communication Conference (OFC)* 2006, OTuF2 2006.
Steven, Frisken "Advances in Liquid Crystal on Silicon Wavelength Selective Switching",*Optical Fiber Communication Conference (OFC)* 2007, OWV4 2007.

* cited by examiner

*Primary Examiner* — Hanh Phan
(74) *Attorney, Agent, or Firm* — Fujitsu Patent Center

(57) ABSTRACT

According to the WDM optical transmission system, for optical signals of respective wavelength in a WDM light propagated through a transmission path, a spectrum component at a center wavelength of each optical signal and a spectrum component in the vicinity of the center wavelength thereof are selectively attenuated by a spectrum correction optical filter, so that the WDM light is transmitted in a state where intensity of sideband components in the spectrum of each optical signal is relatively increased. As a result, even if spectrum width of the optical signal of each wavelength is limited when the WDM light passes through the band-limiting device on the transmission path, degradation of transmission characteristics caused by the attenuation of sideband components is reduced.

11 Claims, 14 Drawing Sheets

CALCULATION MODEL

SPECTRUM OF 40Gb/s DPSK OPTICAL SIGNAL

SPECTRUM OF OPTICAL SIGNAL PASSED THROUGH BAND-PASS FILTER

CALCULATION MODEL

TRANSMISSION METHOD OF WDM LIGHT AND WDM OPTICAL TRANSMISSION SYSTEM

CROSS-REFERENCE TO RELATED APPLICATION

This application is based upon and claims the benefit of priority of the prior Japanese Patent Application No. 2008-319372, filed on Dec. 16, 2008, the entire contents of which are incorporated herein by reference.

FIELD

The embodiment discussed herein is directed to a method for transmitting in excellent characteristics a wavelength division multiplexed (WDM) light which is subjected to band-limitation on a transmission path, and to a WDM optical transmission system.

BACKGROUND

In recent years, in order to cope with a drastic increase of communication traffic with popularization of the Internet, in a WDM optical transmission system, enlargement of transmission capacity due to high bit rate of optical signals and high density of wavelength channels has been strongly demanded. Further, as illustrated in FIG. 13 for example, there has been progressed the establishment of all optical network which connects in seamless between a core network and a metro network or an access network by utilizing a wavelength selective switch (WSS), to flexibly administrate optical signals for each wavelength (refer to: Glenn Baxter et al., "Highly Programmable Wavelength Selective Switch Based on Liquid Crystal on Silicon Switching Elements", Optical Fiber Communication Conference (OFC) 2006, OTuF2; and Steven Frisken, "Advances in Liquid Crystal on Silicon Wavelength Selective Switching", Optical Fiber Communication Conference (OFC) 2007, OWV4).

Typically, a wavelength bandwidth (spectrum width) of optical signal of each wavelength contained in a WDM light is proportional to a bit rate (modulation frequency) thereof. Therefore, as the bit rate of the optical signal of each wavelength is increased, the spectrum width thereof becomes broader, and accordingly, it becomes hard to wavelength multiplex each optical signal in high density. Further, in the optical network as illustrated in FIG. 13, since the spectrum width of the optical signal is limited by an optical device having a filter function which is arranged in each node or the like on a transmission path, transmission characteristics are degraded. As the optical device having the filter function (to be referred to as a band-limiting device hereunder), there are a multiplexer (MUX) which multiplexes optical signals of respective wavelengths to generate a WDM light, a demultiplexer (DEMUX) which demultiplexes the WDM light into the optical signals of respective wavelengths, an optical switch which is used for processing of optical adding/dropping or optical cross-connecting, and the like.

As a conventional technology for decreasing an influence of the above band-limiting device to enable the realization of higher density transmission of WDM light, there has been proposed a partial DPSK (differential phase shift keying) format as disclosed in U.S. Patent Application Publication No. 2007-0196110. This PDPSK format is a technology for, in a receiving section of an optical transmission system in which DPSK modulated optical signals are received/transmitted, setting a delay amount in a delay interferometer to be shorter than 1 bit time, to suppress characteristic degradation of the optical signals passed through the band-limiting device on the transmission path. It has been reported that, by adopting such a PDPSK format, the transmission of the WDM light obtained by wavelength division multiplexing the optical signals of 40 gigabit/second (Gb/s) at 50 gigaherz (GHz) spacing can be realized (refer to B. Mikkelsen et al., "Partial DPSK with excellent filter tolerance and OSNR sensitivity", Electronics Letters, 2006, Vol. 42, No. 23).

However, even in the WDM optical transmission system adopting the above PDPSK format, there is a problem in that degradation of the transmission characteristics is inevitable if the limitation of the spectrum width of each optical signal by the band-limiting device on the transmission path becomes more strictly. Hereunder, there will be described this problem in detail.

FIG. 14 illustrates a typical spectrum of DPSK modulated optical signal of 40 Gb/s. As illustrated in FIG. 14, the spectrum of DPSK modulated optical signal has sidebands on a high frequency side and on a low frequency side around a frequency (wavelength) of a carrier wave (an output light from a laser light source), and in the case of 40 Gb/s exemplarily illustrated herein, the DPSK modulated optical signal has the bandwidth of equal to or higher than 100 GHz in total. The WDM light is obtained by wavelength division multiplexing a plurality of the above optical signals of which center wavelengths are different from each other. In the transmission of such a WDM light, even if the optical signals of respective wavelengths are at high bit rate such as 40 Gb/s, the signal transmission by dense wavelength multiplexing at 100 GHz spacing or 50 GHz spacing is becoming typical. In the case where such a high-speed and high-dense WDM light is transmitted, there is a problem in that in the band-limiting device arranged on the transmission path, sideband components of the optical signal of each wavelength are eliminated so that the transmission characteristics are degraded.

To be specific, in the case where the DPSK optical signal of 40 Gb/s illustrated in FIG. 14 passes through a primary Gaussian filter (band-pass filter) having 3 dB bandwidth of 40 GHz as illustrated in FIG. 15 for example, the spectrum of this optical signal has a form as illustrated in FIG. 16. As apparent from FIG. 16, the sideband components of the optical signal are attenuated during the optical signal passes through the band-pass filter, so that a spectrum form thereof is significantly changed. The above described band-limiting device on the transmission path is equivalent to the band-pass filter in this example.

Here, there will be described in detail an influence of the attenuation of sideband components of the optical signal as described above on the transmission characteristics, using a simulation result for the case of adopting the above PDPSK format.

FIG. 17 is a diagram illustrating the outline of calculation model in the simulation relating to the WDM optical transmission system adopting the PDPSK format. In this calculation model, a pseudo random bit stream generated in a PRBS circuit 111 inside of an optical transmitting section 110 is fed to a DPSK pre-coder 112 so that a data signal corresponding to a DPSK format is generated, and a LN modulator (MOD) 112 is driven based on a modulation signal generated in a driver circuit (DRV) 113 in accordance with the data signal. As a result, a carrier wave output from a laser light source (LD) 115 is phase modulated so that a DPSK optical signal is transmitted to a transmission path 120. On the transmission path 120, there are arranged: an optical attenuator (ATT) 131 and an optical amplifier 132, for controlling an optical signal to noise ratio (OSNR) of the DPSK optical signal; and a band-pass filter (primary Gaussian filter) 133 for limiting the spectrum width of the DPSK optical signal, and the DPSK optical signal passed through the band-pass filter 133 is received by an optical receiving section 140. In the optical receiving section 140, the DPSK optical signal is processed to be demodulated by a delay interferometer 141 and a balance receiver 142, so that a bit error rate (BER) of the received signal is measured by a BER measuring device 143. A delay time in the delay interferometer 141 is set at 16.25 picoseconds (ps) corresponding to 65% of 1 bit time, to thereby correspond to the PDPSK format.

FIG. 18 illustrates relations between the OSNR and the BER for the cases where the 3 dB bandwidth of the band-pass filter 133 is 37 GHz, 26 GHz and 21 GHz, in the calculation model in FIG. 17. In this regard, the OSNR is a value measured with the resolution 0.5 nm, and the bands of the optical transmitting section 110 and optical receiving section 140 are properly set. As apparent from FIG. 18, when the 3 dB bandwidth of the band-pass filter 133 is broad to an extent of 37 GHz, a value of the BER is significantly decreased as the OSNR is increased (improved). On the other hand, if the 3 dB bandwidth of the band-pass filter 133 becomes narrower to 26 GHz or 21 GHz, the value of the BER is not so decreased although the OSNR is increased. Namely, even in the case of adopting the PDPSK format, as the bandwidth of the band-pass filter 133 is decreased, the BER is degraded.

Accordingly, in the case where the band-limiting device of narrow bandwidth is arranged on the transmission path, or in the case where a large number of band-limiting devices is arranged on the transmission path and the bandwidth of total filter characteristics of these band-limiting devices becomes narrower, even if the PDPSK format is adopted, it becomes hard to effectively suppress the degradation of transmission characteristics caused by the attenuation of sideband components by the band-limiting device. Such a problem caused by the attenuation of sideband components is not limited to the DPSK format for optical signal modulation, but also, is common to phase modulating formats other than the DPSK format, intensity modulating formats such as a NRZ (non return to zero) format, a RZ (return to zero) format and the like.

SUMMARY

According to an aspect of the invention, a WDM optical transmission system includes: a transmission path through which a WDM light containing a plurality of optical signals of different wavelengths is propagated; and at least one band-limiting device arranged on the transmission path, for limiting spectrum width of the optical signal of each wavelength when the WDM light passes through the band-limiting device. The WDM optical transmission system further includes a spectrum correction optical filter having transmission wavelength characteristics capable of selectively attenuating a spectrum component at a center wavelength of the optical signal of each wavelength contained in the WDM light and a spectrum component in the vicinity of the center wavelength thereof, and spectrum correction is performed for increasing relative intensity of sideband components in the spectrum of each optical signal when the optical signal of each wavelength in the WDM light passes through the spectrum correction optical filter.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Hereinafter, embodiments of the invention will be described with reference to drawings.

Figure 1:
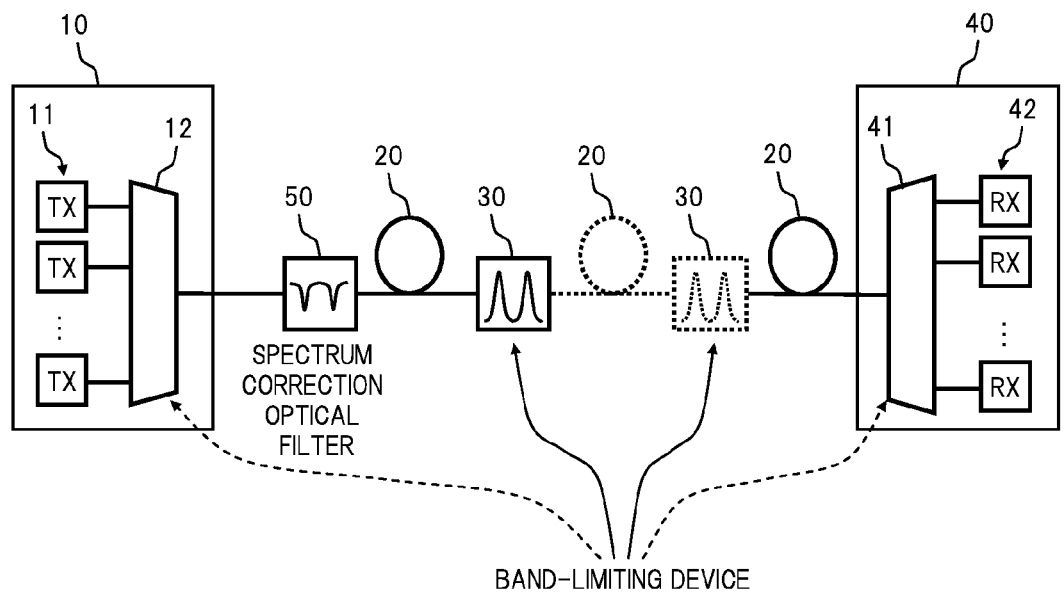
FIG. 1 is a diagram illustrating a configuration of one embodiment of a WDM optical transmission system according to the invention.

FIG. 1 is a diagram illustrating a configuration of one embodiment of a WDM optical transmission system according to the invention.

In FIG. 1, the WDM optical transmission system in the present embodiment comprises, for example: an optical transmission apparatus 10 which transmits a WDM light containing a plurality of optical signals of different wavelengths; a transmission path 20 through which the WDM light from the optical transmission apparatus 10 is propagated; a band-limiting device 30 which limits spectrum width of the optical signal of each wavelength, in each node or the like; an optical reception apparatus 40 which receives the WDM light transmitted over the transmission path 20; and a spectrum correction optical filter 50 which is arranged on the transmission path 20 positioned in the vicinity of the optical transmission apparatus 10, and selectively attenuates a spectrum component at a center wavelength of the optical signal of each wavelength in the WDM light and a spectrum component in the vicinity of the center wavelength thereof.

Figure 14:
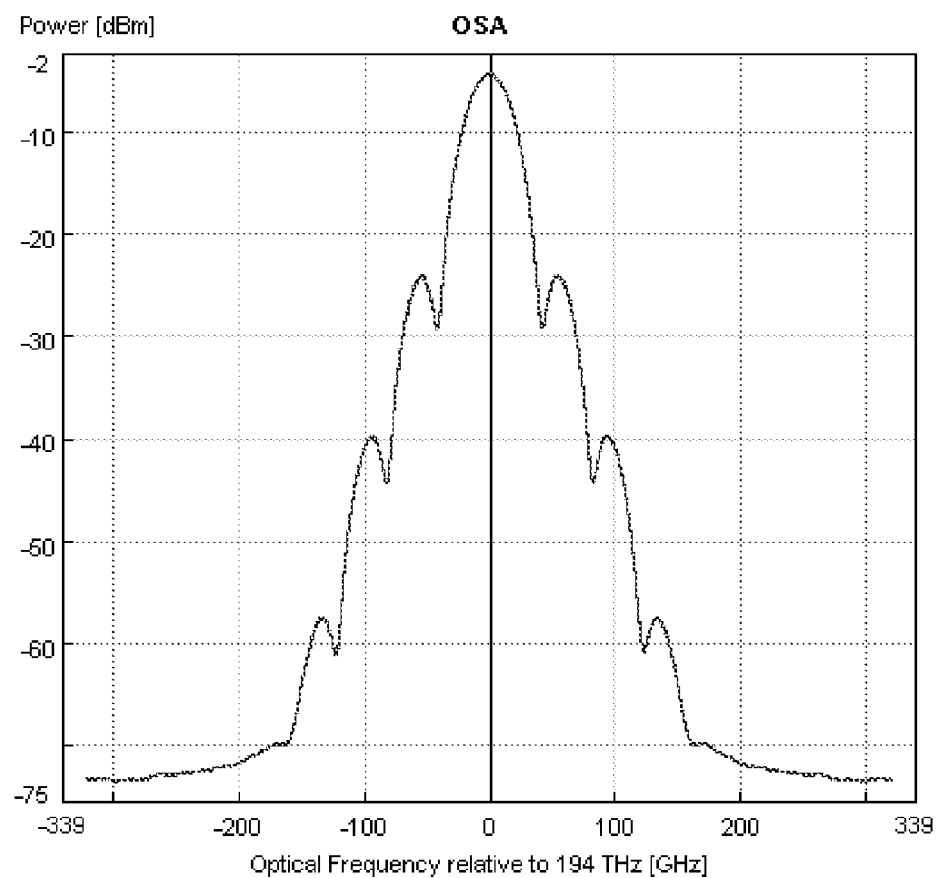
FIG. 14 is a diagram illustrating a spectrum of a DPSK optical signal of 40 Gb/s.
Figure 15:
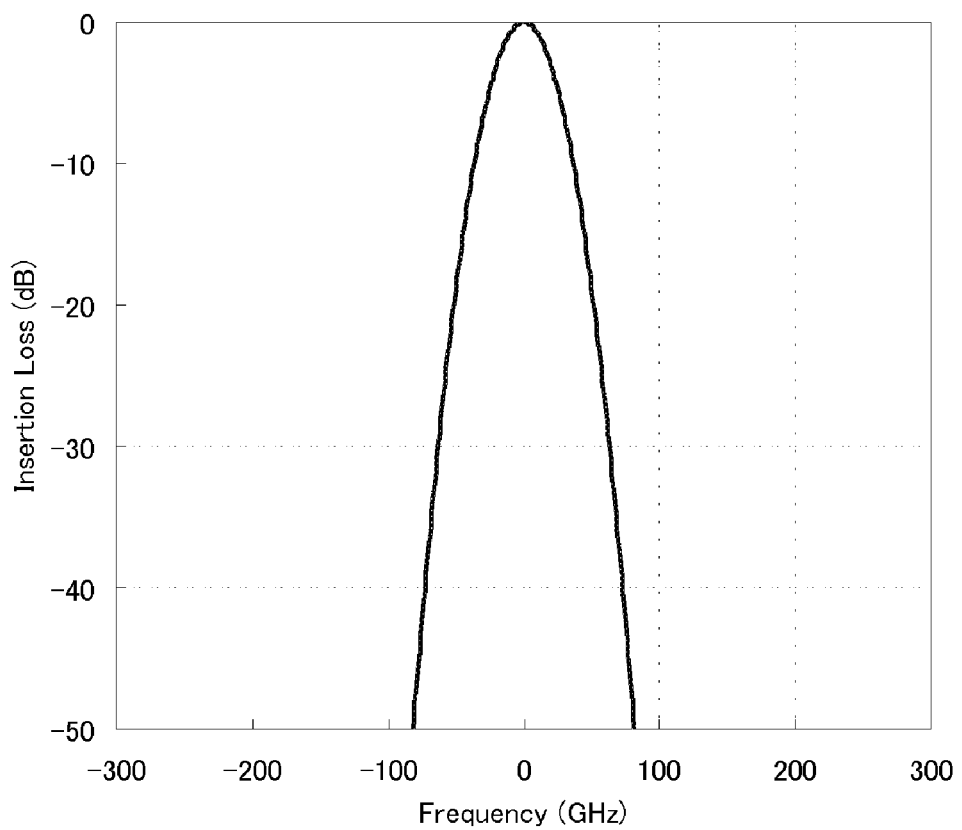
FIG. 15 is a diagram illustrating characteristics of a band-pass filter having 3 dB bandwidth of 40 GHz.

The optical transmission apparatus 10 includes a plurality of transmitters (TX) 11 and a multiplexer 12, and multiplexes the optical signals of different wavelengths output from the transmitters 11 using the multiplexer 12, to output the multiplexed light to the transmission path 20. The center wavelengths (frequencies) of the optical signals output from the respective transmitters 11 are allocated on required grids corresponding to very narrow wavelength spacing, for example, 100 GHz spacing, 50 GHz spacing or the like. Further, a spectrum of each optical signal has a form (spectrum width) corresponding to a modulation format thereof and a bit rate thereof. For example, a DPSK modulated optical signal of 40 Gb/s has a spectrum form as illustrated in FIG. 14. The multiplexer 12 has transmission bands respectively corresponding to the optical signals of respective wavelengths. If respective bandwidths of the transmission bands are narrower than the spectrum widths of the optical signals, since the spectrum widths of the optical signals are limited when the optical signals are multiplexed, the multiplexer 12 can be used as one of band-limiting devices.

Figure 16:
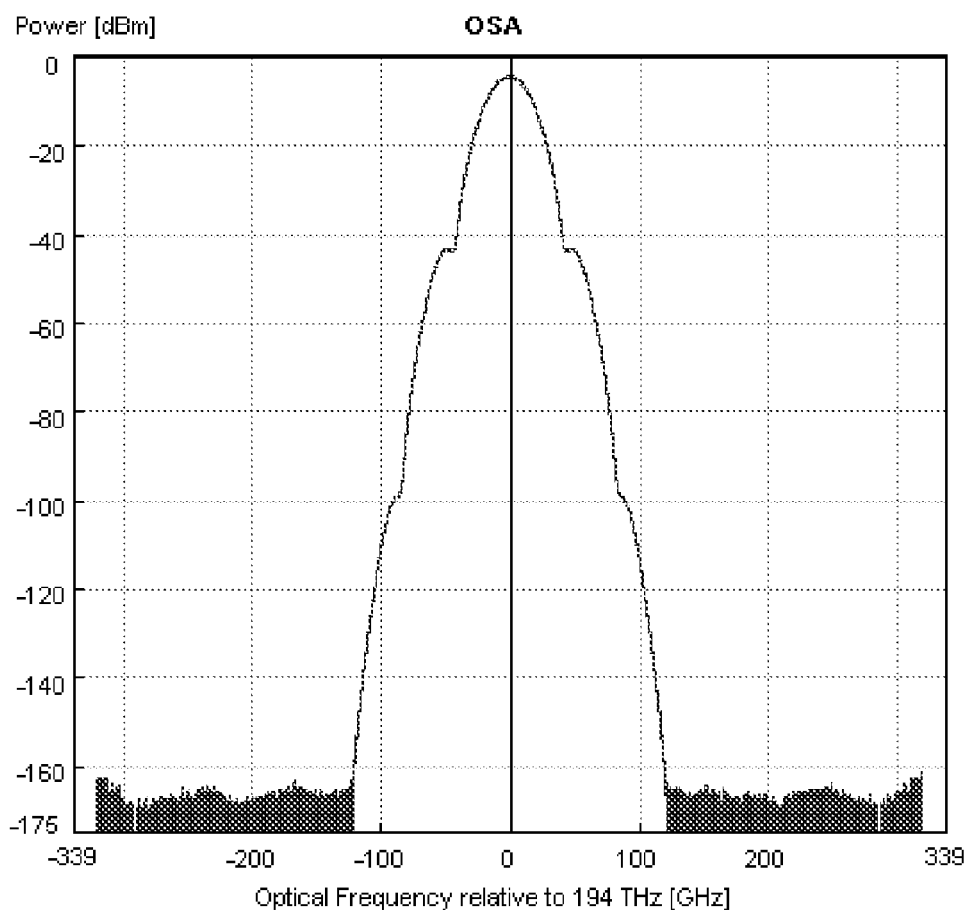
FIG. 16 is a diagram illustrating the spectrum of the DPSK optical signal passed through the band-pass filter in FIG. 15.

The band-limiting device 30 on the transmission path 20 corresponds to a demultiplexer and a multiplexer, which are to be used when processing such as dispersion compensation or the like on the optical signals of respective wavelengths contained in the WDM light is performed for each wavelength in a required node on the transmission path 20, an optical switch to be used when processing such as an optical adding/dropping or an optical cross-connecting is performed on the WDM light, or the like. Such a band-limiting device 30 has transmission bandwidths, which respectively correspond to the optical signals of respective wavelengths contained in the WDM light, narrower than the spectrum widths of the optical signals, and limits the spectrum widths of the optical signals when required processing is performed. For example, if the DPSK modulated optical signal of 40 Gb/s is processed by the band-limiting device 30, the optical signal after processed has a spectrum form of which sideband components are attenuated, as illustrated in FIG. 16. The band-limiting device 30 described above may be not only one but also in plural numbers on the transmission path 20. If a plurality of band-limiting devices 30 is arranged on the transmission path 20, the spectrum widths of the optical signals of respective wavelength contained in the WDM light which has been propagated through the transmission path 20 to reach the optical reception apparatus 40, are limited according to total filter characteristics of the plurality of band-limiting devices 30.

The optical reception apparatus 40 includes a demultiplexer 41 and a plurality of receivers (RX) 42, and demultiplexes the WDM light from the transmission path 20 into the optical signals of respective wavelength using the demultiplexer 41, to reception process the optical signals in the receivers 42 corresponding thereto. The demultiplexer 41 has transmission bands respectively corresponding to the optical signals of respective wavelengths. If respective bandwidths of the transmission bands are narrower than the spectrum widths of the optical signals, since the spectrum widths of the optical signals are limited when the WDM light is demultiplexed, the demultiplexer 41 can be used as one of the band-limiting devices. Each receiver 42 executes typical reception processing corresponding to the modulation format of each optical signal and the bit rate thereof.

The spectrum correction optical filter 50 is provided with filter characteristics (transmission wavelength characteristics) such that transmittance thereof is changed in periods corresponding to wavelength spacing of the optical signals contained in the WDM light transmitted from the optical transmission apparatus 10 to the transmission path 20. The periodic filter characteristics are optimized so that a center wavelength of a loss peak at which the transmittance becomes minimal is substantially coincident with the center wavelength of each optical signal in the WDM light. As the above spectrum correction optical filter 50, it is possible to use a periodic filter such as etalon (Fabry-Perot resonator). Further, it is also possible to realize a function same as the etalon by utilizing, for example, a fiber bragg grating (FBG), an arrayed waveguide grating (AWG), an acousto-optic tunable filter (AOTF) or the like.

Figure 2:
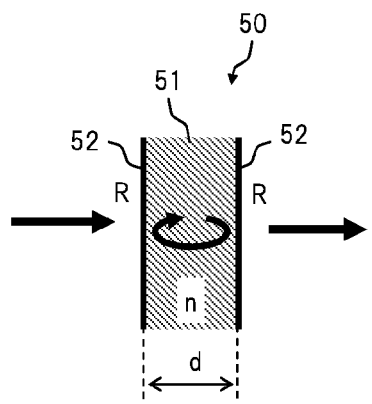
FIG. 2 is a diagram illustrating a configuration example of a spectrum correction optical filter in the embodiment.

To be specific, a configuration example of the spectrum correction optical filter 50 using the etalon is illustrated in FIG. 2.

In this configuration example, partial reflective films 52A and 52B each having reflectivity R are formed on opposite parallel planes of a flat plate 51 transparent to the WDM light, so that the etalon is formed. To the spectrum correction optical filter 50 using the etalon, the WDM light is incident into the flat plate 51 from a side of one partial reflective film 52A, and a part of the WDM light is emitted from a side of the other partial reflective film 52B during the incident light is multiply reflected between the partial reflective films 52A and 52B. As a result, wavelength characteristics in which the transmittance (or a loss) is periodically changed according to a distance (thickness of the flat plate 51) "d" between the partial reflective films 52A and 52B, and a refractive index "n" of the flat plate 51, are realized.

For the periodic filter characteristics of the etalon, in the case where the light is vertically incident on the partial reflective film 52A, a free spectral range (FSR) indicating frequency spacing of adjacent transmission (loss) peaks is represented by the following formula (1).

$$FSR = \frac{c}{2nd} \quad (1)$$

Further, the above filter characteristics are such that as the reflectivity R of the partial reflective films 52A and 52B becomes larger, amplitudes of the respective transmission (loss) peaks periodically repeated become larger. If the reflectivity R of the partial reflective films 52A and 52B is used, Finess representing sharpness of peak using a ratio of the FSR to full width at half maximum (FWHM) of one peak is in a relation as indicated in the following formula (2).

$$Finess = \frac{FSR}{FWHM} = \frac{\pi\sqrt{R}}{1-R} \quad (2)$$

Figure 3:
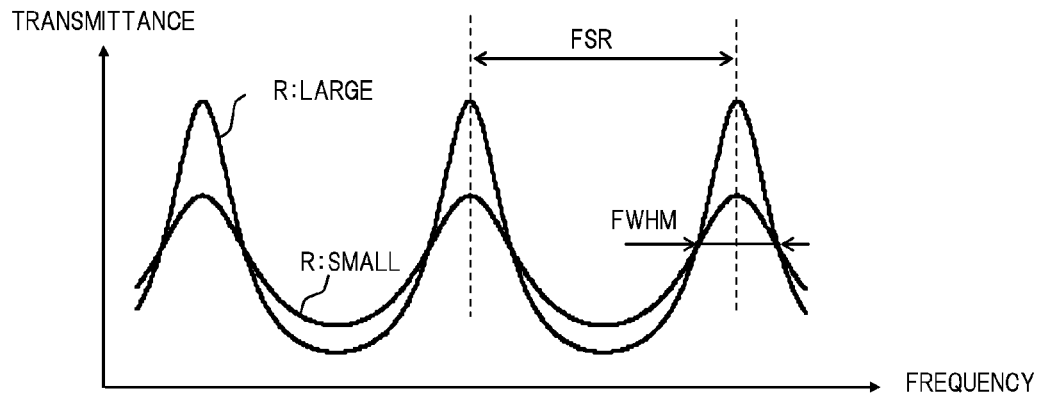
FIG. 3 is a diagram for explaining filter characteristics of etalon.

FIG. 3 illustrates one example in which the periodic filter characteristics (a relation of the transmittance to the frequency) of the etalon are indicated according to the reflectivity R of the partial reflective films 52A and 52B. As illustrated in FIG. 3, when the reflectivity R of the partial reflective films 52A and 52B becomes relatively larger, the transmission peak is sharpened and a value of the Finess becomes larger.

In order to realize the spectrum correction optical filter utilizing the periodic filter characteristics of the etalon as described above, the thickness d of the flat plate 51 of the etalon and the refractive index n thereof may be designed in optimum, and also, the reflectivity R of the partial reflective films 52A and 52B of the etalon may be designed in optimum according to a degree of band-limitation to which each optical signal is subjected by the band-limiting device 30, so that the center wavelength of each optical signal in the WDM light is substantially coincident with the center wavelength of the loss peak in the etalon.

Next, there will be described an operation in the WDM optical transmission system of the present embodiment.

In the WDM optical transmission system of the above configuration, the optical signals output from the transmitters 11 in the optical transmission apparatus 10 are multiplexed by the multiplexer 12 so that the WDM light is generated, and the generated WDM light is output to the transmission path 20. The WDM light transmitted to the transmission path 20 is firstly fed to the spectrum correction optical filter 50. In the spectrum correction optical filter 50, the spectrum component corresponding to the center wavelength of each optical signal contained in the WDM light and the spectrum component in the vicinity of the center wavelength thereof are selectively attenuated, according to the periodic filter characteristics of the spectrum correction optical filter 50. As a result, for the WDM light passed through the spectrum correction optical filter 50, the sideband components in the spectrum of the optical signal of each wavelength is intensified compared with that before passing through the spectrum correction optical filter 50. Namely, the WDM light passes through the spectrum correction optical filter 50, so that the relative intensity of the sideband components in the spectrum of the optical signal of each wavelength is increased.

Figure 4:
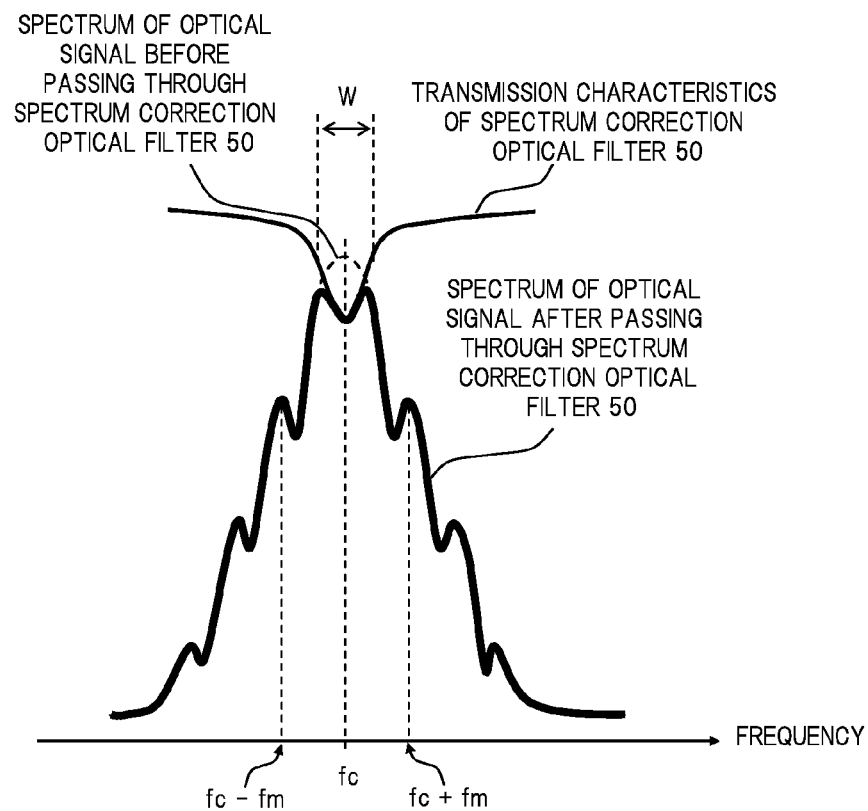
FIG. 4 is a diagram illustrating one example of spectrum of an optical signal passed through the spectrum correction optical filter in the embodiment.

For example, in the case where the WDM light to be input to the spectrum correction optical filter 50 contains the DPSK modulated optical signal of 40 Gb/s, the DPSK modulated optical signal passes through the spectrum correction optical filter 50, so that the spectrum thereof is changed into a form as illustrated by a bold line in FIG. 4. In the example of FIG. 4, frequency characteristics of transmittance of the spectrum correction optical filter 50 are indicated by a narrow line, and there is the peak (loss peak) at which the transmittance becomes minimal in a center frequency fc of the optical signal. If the full width at half maximum of the loss peak is W, it is preferable that the full width at half maximum W is set to be broader than a frequency fm corresponding to the bit rate of the optical signal, and also, to be narrower than two times of fm (fm<W<2·fm). Namely, for the spectrum (broken line) of the DPSK optical signal input to the spectrum correction optical filter 50, the optical power thereof becomes maximum at the center frequency fc, and there are peaks (sideband peaks) at which the optical power becomes maximal at the frequency fc±fm separated by fm to a high frequency side and a low frequency side from the maximum peak. In order to effectively intensify the sideband components in the spectrum of the optical signal, it is preferable to intensify the frequency component around the two sideband peaks. Taking this into consideration, it is effective to selectively attenuate a spectrum component between the two sideband peaks, by making the full width at half maximum of the loss peak of the spectrum correction optical filter 50 to be the range of fm<W<2·fm.

Further, for the depth of the loss peak of the spectrum correction optical filter 50 corresponding to the center frequency fc of the optical signal, as the band-limitation to which the optical signal is subjected by the band-limiting device 30 on the transmission path 20 becomes more strictly, the loss peak is made deeper so that a degree of relative intensity of the sideband components becomes larger. Incidentally, in the case where the spectrum correction optical filter 50 is realized using the etalon as described above, the optimization of the loss peak depth is performed by regulating the reflectivity R of the partial reflective films 52A and 52B. Furthermore, if the optical signal is subjected to the band-limitation also by the multiplexer 12 in the optical transmission apparatus 10 or by the demultiplexer 41 in the optical reception apparatus 40, it is preferable to determine the loss peak depth by containing an influence of the band-limitation by the multiplexer 12 or by the demultiplexer 41 into the band-limitation by the band-limiting device 30.

The WDM light passed through the spectrum correction optical filter 50 as described above is transmitted up to the optical reception apparatus 40 while being subjected to the band-limitation when passing through the band-limiting device 30 arranged on the transmission path 20. Since the relative intensity of the sideband components in the spectrum of the optical signal of each wavelength is increased in advance by the spectrum correction optical filter 50, the strength of the sideband components to the attenuation in the band-limiting device 30 is increased. The WDM light reached the optical reception apparatus 40 is demultiplexed into the optical signal of each wavelength by the demultiplexer 41, and thereafter, the optical signal of each wavelength is reception processed by the receiver 42 corresponding thereto.

Even though the sideband components in the spectrum of the optical signal is attenuated by the band-limiting device 30, since a change in a ratio of the sideband components to the spectrum component in the vicinity of the center wavelength is suppressed compared with that in a conventional system configuration in which the spectrum correction optical filter 50 is not disposed, reception characteristics of the optical signal in each receiver 42 is excellent.

There will be specifically described an improvement effect of the transmission characteristics by the above described spectrum correction optical filter 50, using a simulation result for the case where a partial DPSK (PDPSK) format is adopted.

Figure 5:
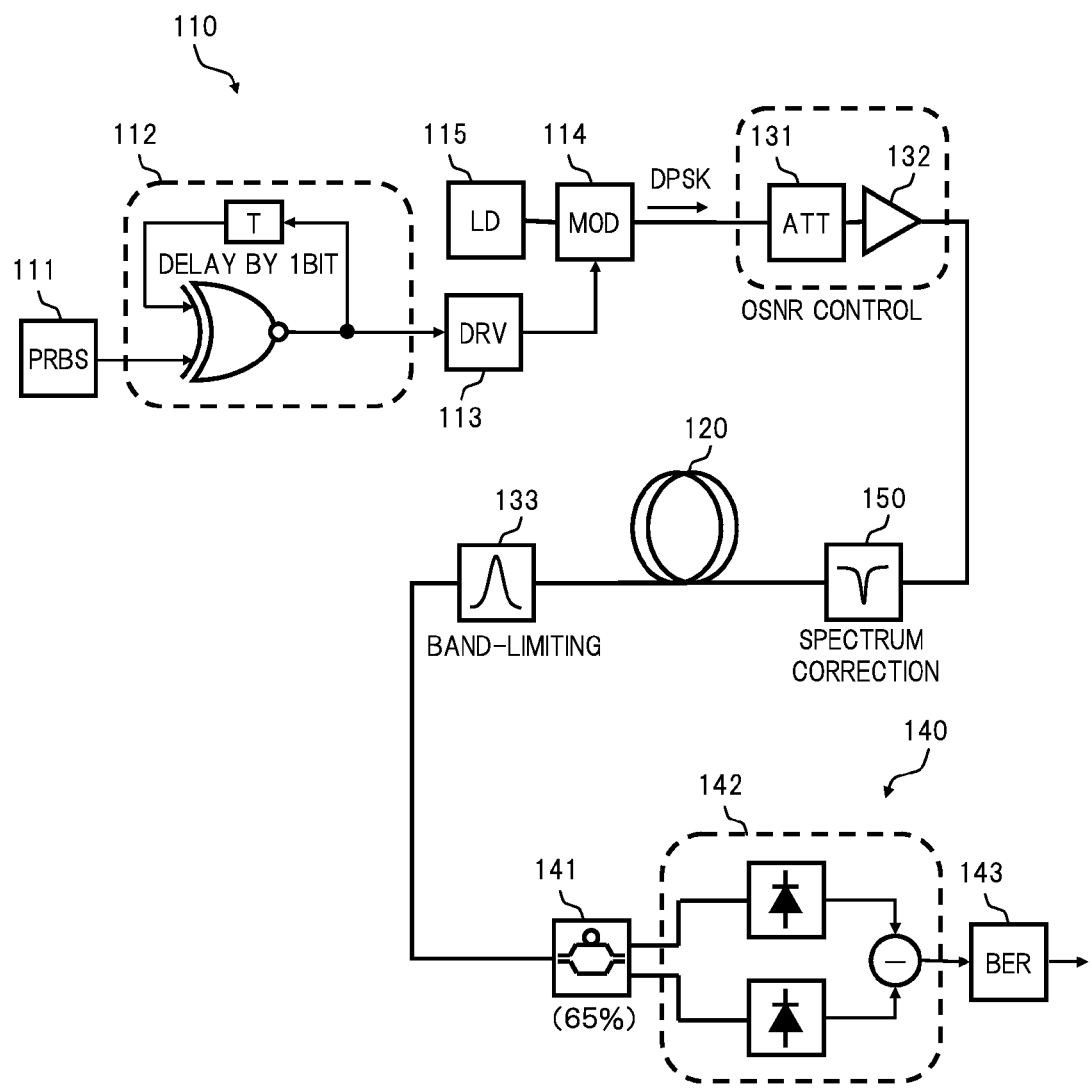
FIG. 5 is a diagram illustrating the outline of calculation model in simulation related to the embodiment.

FIG. 5 is a diagram illustrating the outline of calculation model in the simulation related to the present embodiment. Same parts as those in the calculation model in the simulation related to the already described conventional system illustrated in FIG. 17 are denoted by same reference numerals, and the description thereof is omitted here.

Figure 17:
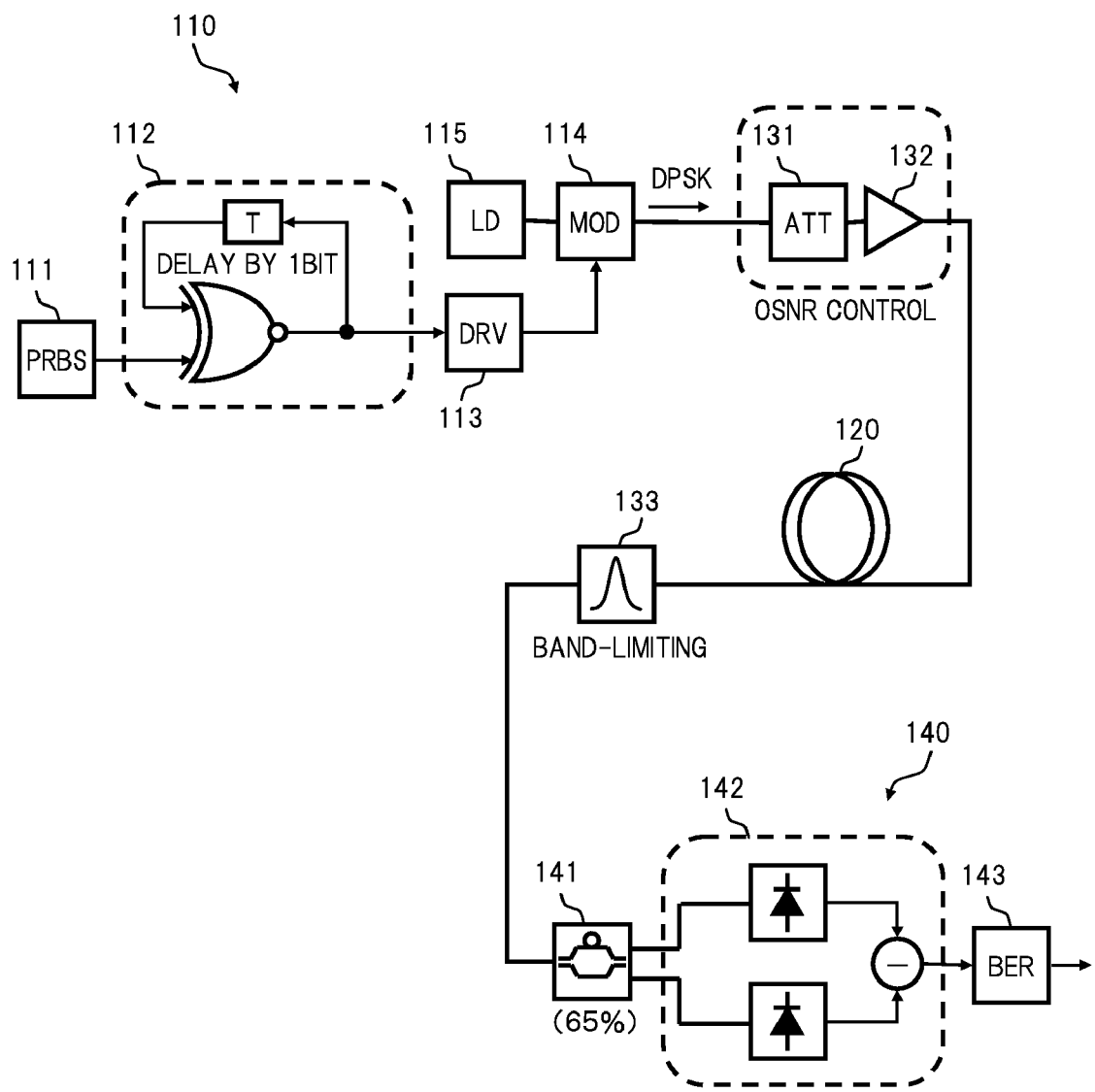
FIG. 17 is a diagram illustrating the outline of calculation model in simulation related to a WDM optical transmission system adopting a PDPSK format.
Figure 18:
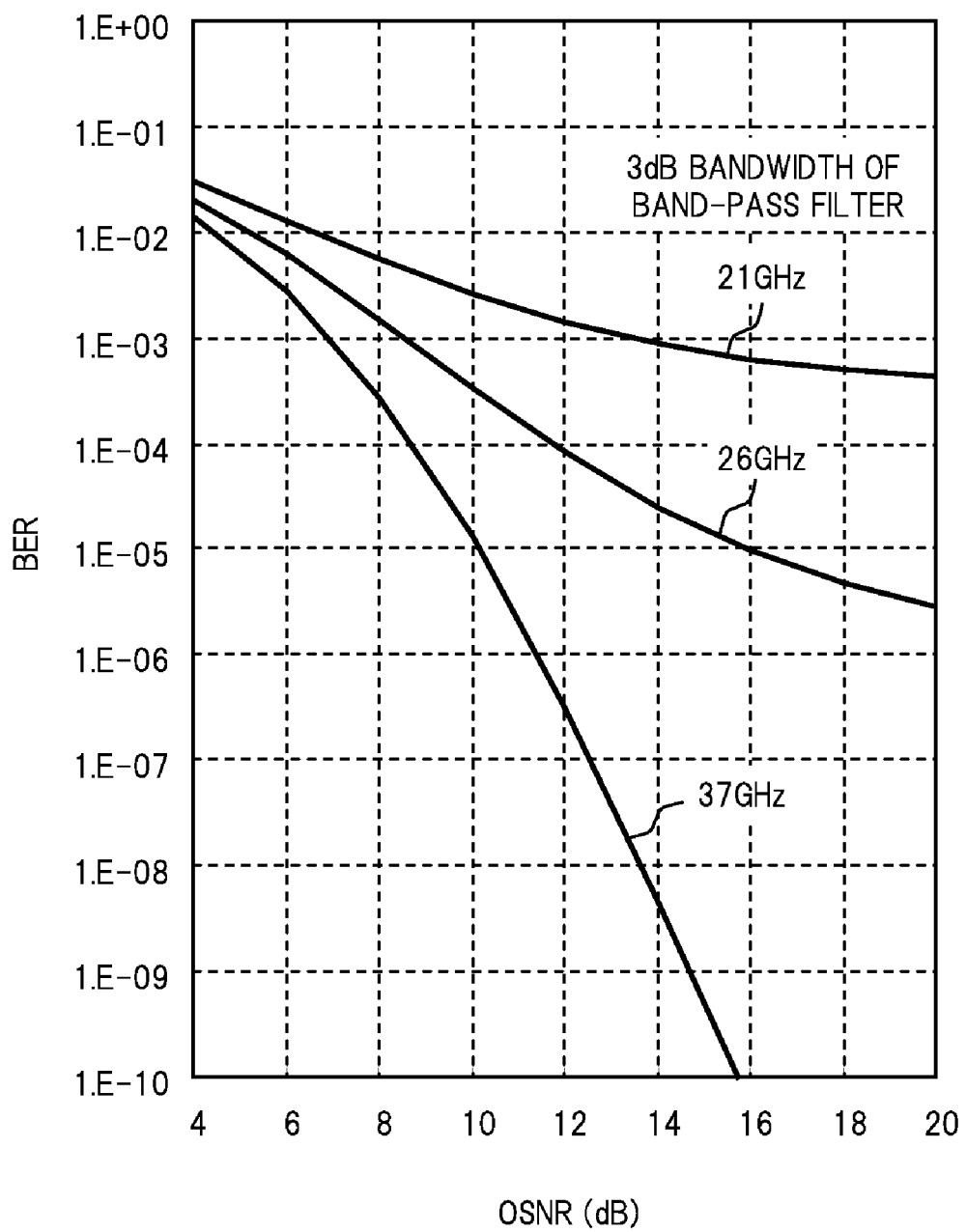
FIG. 18 is a diagram illustrating a calculation result of the relation between the OSNR and the BER by changing the 3 dB bandwidth of the band-pass filter in the calculation model of FIG. 17.

The calculation model illustrated in FIG. 5 differs from that of FIG. 17 in that an etalon 150 equivalent to the spectrum correction optical filter 50 is inserted on the transmission path 120 connecting the optical transmission section 110 and the optical reception section 140. In this calculation model, the arbitrary transmitter 11 in the optical transmission apparatus 10 of FIG. 1 corresponds to the optical transmitting section 110, the band-limiting devices (to be specific, the multiplexer 12 in the optical transmission apparatus 10, the band-limiting device 30 on the transmission path 20, the demultiplexer 41 in the optical reception apparatus 40) each corresponds to the band-pass filter (primary Gaussian filter) 133, and the arbitrary receiver 42 in the optical reception apparatus 40 corresponds to the optical receiving section 140.

Figure 6:
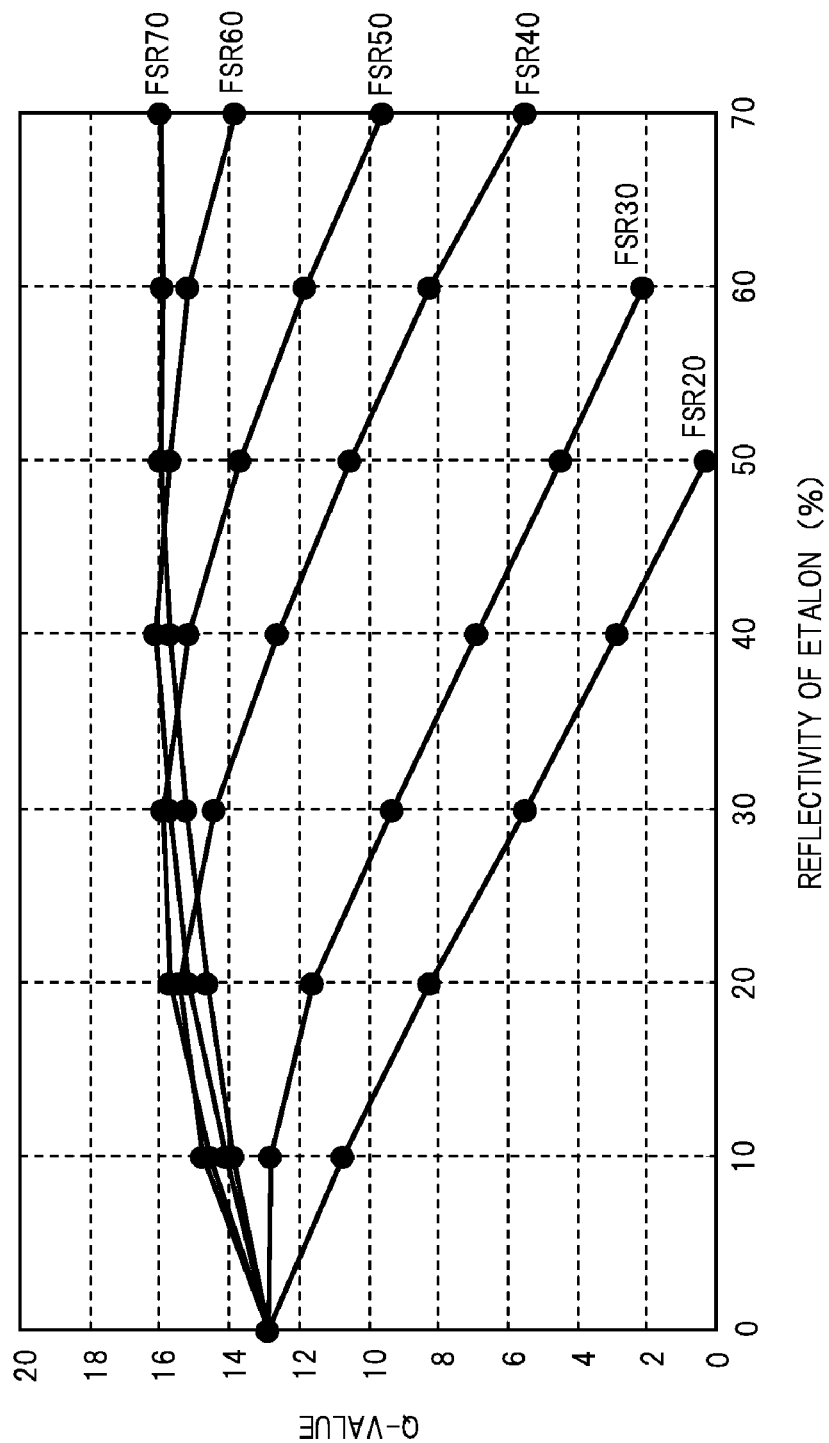
FIG. 6 is a diagram illustrating a calculation result of Q-value by changing a FSR of the etalon and reflectivity thereof in the calculation model of FIG. 5.

FIG. 6 illustrates a calculation result of Q-value for when a free spectral range (FSR) of the etalon 150 and reflectivity thereof are changed, in the case where the 3 dB bandwidth of the band-pass filter 133 is 26 GHz. In this regard, herein, the calculation is performed by taking not only the transmittance (loss) but also frequency characteristics of dispersion (phase) into consideration as filter characteristics of the etalon 150, provided that the OSNR is 18 dB (resolution 0.5 nm).

It is understood from the calculation result of FIG. 6 that by properly selecting the FSR of the etalon 150 and the reflectivity thereof, the Q-value improvement of about 3 dB can be realized compared with the case where the etalon 150 equivalent to the reflectivity of 0% is not disposed. For example, focusing on the case where 50 GHz is selected as the FSR of the etalon 150, the Q-value reaches about 16 dB by setting the reflectivity of the etalon 150 at the parallel planes in the vicinity of 30%. Since the Q-value is about 13 dB for when the reflectivity is 0%, the Q-value is improved by about 3 dB by inserting the optimized etalon 150.

Figure 7:
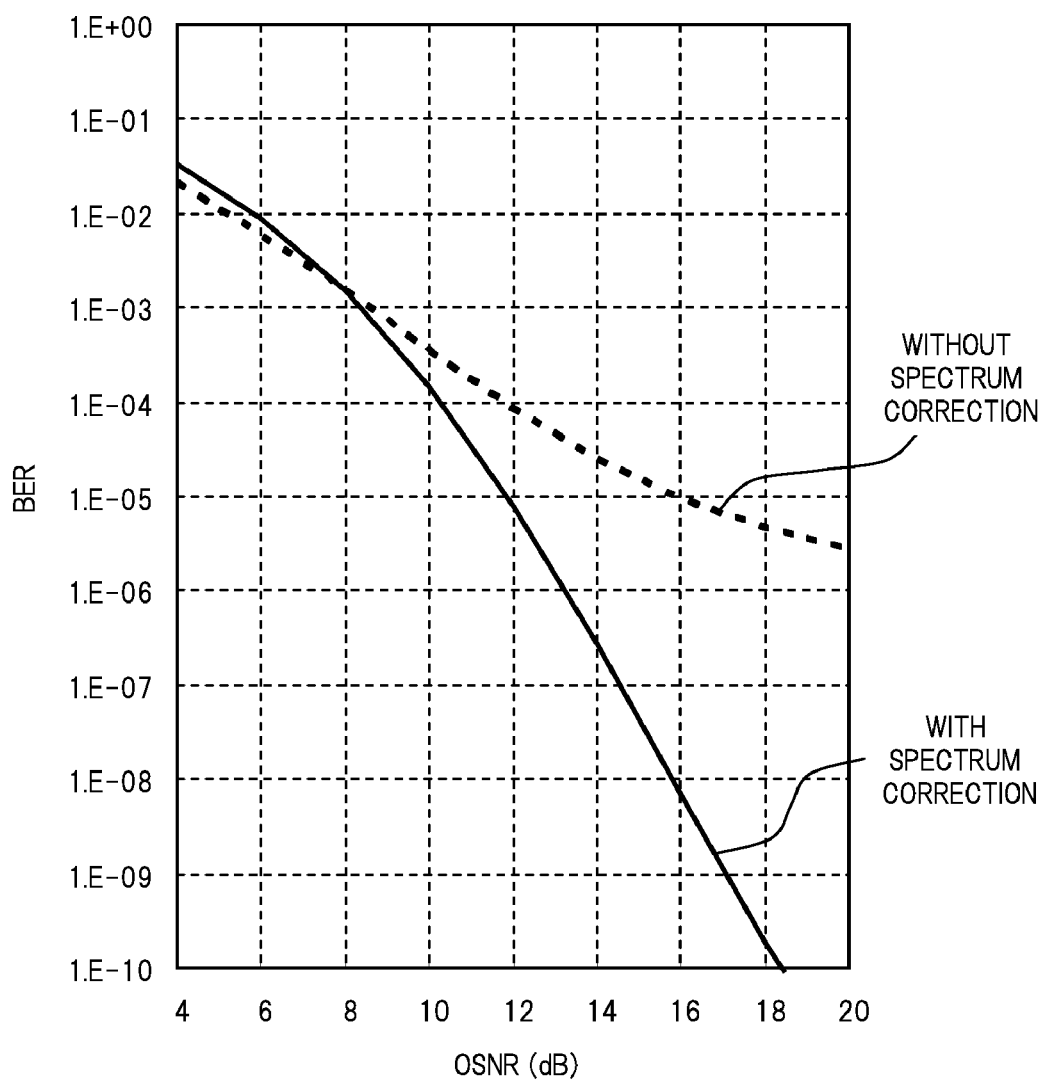
FIG. 7 is a diagram illustrating a calculation result of a relation between an OSNR and a BER in the calculation model of FIG. 5.

FIG. 7 illustrates a relation between the OSNR and the BER for when the 3 dB bandwidth of the band-pass filter 133 is 26 GHz, in the calculation model of FIG. 5, and a solid line in the figure indicates the calculation result for when the FSR of the etalon 150 is 50 GHz and the reflectivity thereof is 30%, and further, a broken line indicates the calculation result for when the reflectivity of the etalon 150 is 0% (the spectrum of the optical signal is not corrected). It is understood from the calculation result in FIG. 7 that in the system adopting the PDPSK format, by performing the spectrum correction of the optical signal using the optimized etalon 150, even if the bandwidth of the band-pass filter 133 becomes narrower, the value of the BER is significantly decreased accompanied with the increase (improvement) of the OSNR, and accordingly, the BER is considerably improved in comparison with the case where the spectrum correction is not performed, so that the excellent transmission characteristics can be realized.

Figure 8:
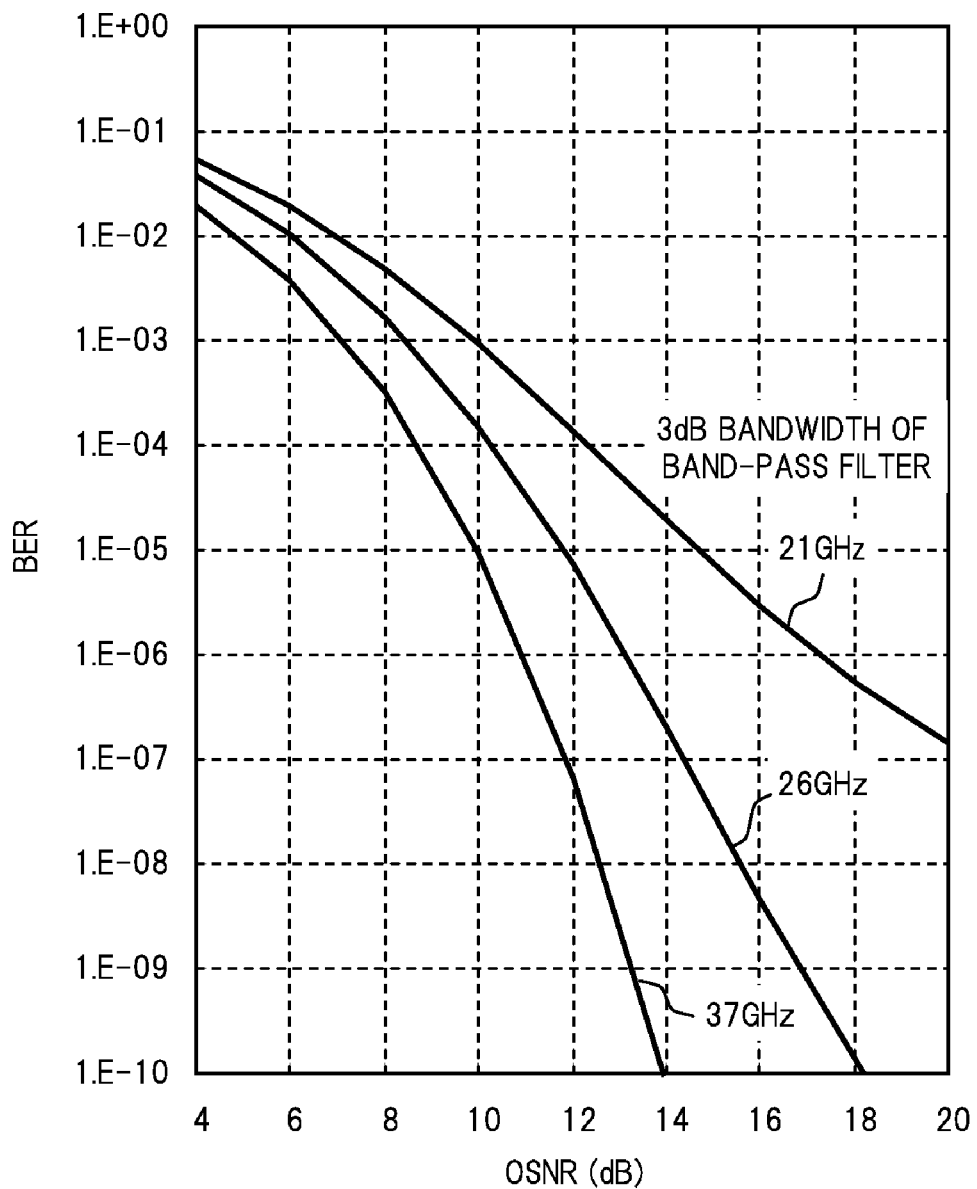
FIG. 8 is a diagram illustrating a calculation result of the relation between the OSNR and the BER in the calculation model of FIG. 5 by changing the FSR of the etalon.

FIG. 8 illustrates a calculation result for obtaining the relation between the OSNR and the BER for the case where the 3 dB bandwidth of the band-pass filter 133 is changed to 37 GHz, 26 GHz and 21 GHz, provided that the FSR of the etalon 150 is 50 GHz and the reflectivity thereof is 30%. As apparent from the comparison with FIG. 8, by performing the spectrum correction of the optical signal using the optimized etalon 150, it becomes possible to improve the BER in all of the three bandwidths of the band-pass filter 133.

As described in the above, according to the WDM optical transmission system in the embodiment, for the optical signal of each wavelength contained in the WDM light, the spectrum component at the center wavelength and the spectrum component in the vicinity of the center wavelength are selectively attenuated by the spectrum correction optical filter 50, to thereby transmit the WDM light in the state where the intensity of sideband components in the spectrum of each optical signal is relatively increased, so that even if the band-limitation to each optical signal in the band-limiting device 30 becomes more strict, the degradation of transmission characteristics caused by the attenuation of sideband components can be reduced. As a result, it becomes possible to realize the high-bit rate and high wavelength density WDM light transmission in excellent transmission characteristics with error-free.

Incidentally, in the above embodiment, one example has been illustrated in which the spectrum correction optical filter 50 is arranged on the transmission path 20 in the vicinity of the output end of the optical transmission apparatus 10. However, even in the case where the spectrum correction optical filter 50 is arranged on an arbitrary position on the transmission path 20, an operational effect similar to that in the above embodiment can be achieved. Further, it is also possible to arrange the spectrum correction optical filter on arbitrary plural positions (for example, if a plurality of band-limiting devices is on the transmission path 20, positions corresponding to the respective band-limiting devices) on the transmission path 20, to thereby perform decentrally the spectrum correction on the optical signal of each wavelength between the optical transmission apparatus 10 and the optical reception apparatus 40.

Figure 9:
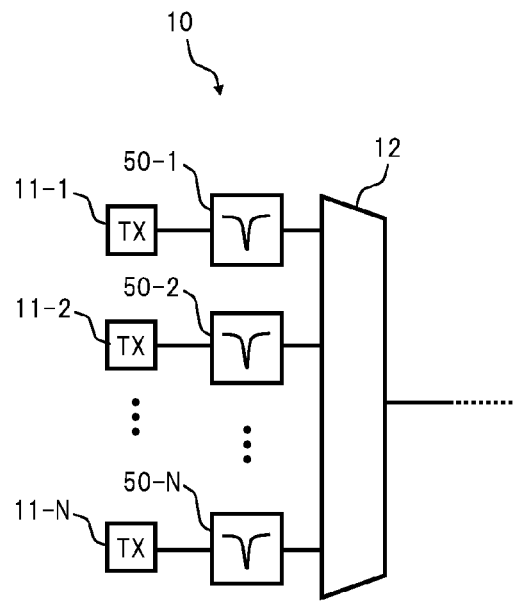
FIG. 9 is a diagram illustrating a configuration example for the case where the spectrum correction optical filter is disposed in an optical transmission apparatus, related to the above embodiment.

Further, there has been described the configuration example in which the spectrum correction on the optical signal of each wavelength in the WDM light is centrally performed using the spectrum correction optical filter 50 having the periodic filter characteristics. However, as illustrated in FIG. 9 for example, spectrum correction optical filters 50-1 to 50-N may be disposed on respective output ends of a plurality of transmitters 11-1 to 11-N in the optical transmission apparatus 10, to thereby perform individually the spectrum correction on the optical signal of each wavelength. In this case, filter characteristics of each of the spectrum correction optical filters 50-1 to 50-N may only have a single loss peak coincident with the center wavelength (frequency) of the optical signal output from each of the transmitters 11-1 to 11-N, and therefore, it becomes also possible to utilize a notch filter without periodicity in addition to the periodic filter such as the above described etalon or the like. Similarly to this, as illustrated in FIG. 10 for example, the spectrum correction optical filters 50-1 to 50-N may be disposed on input ends of receivers 42-1 to 42-N corresponding to each wavelength in the optical reception apparatus 40.

Figure 10:
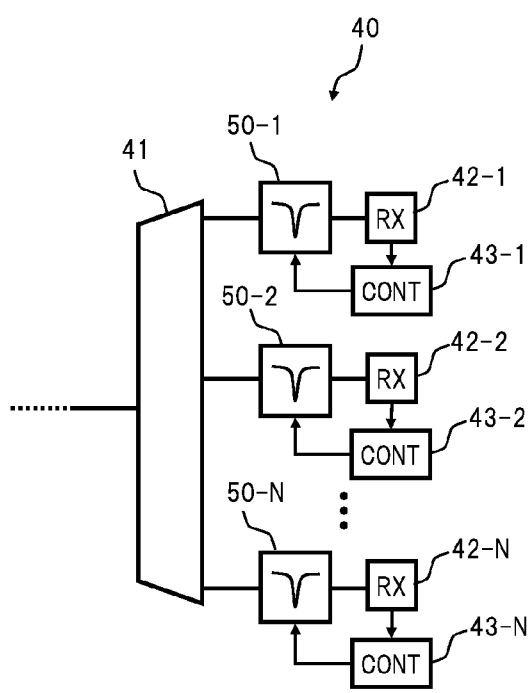
FIG. 10 is a diagram illustrating a configuration example for the case where the spectrum correction optical filter is disposed in an optical receiving apparatus, related to the embodiment.

Furthermore, as in the configuration example of FIG. 10, in the case where the spectrum correction is performed for each wavelength at the reception end, as the spectrum correction optical filters 50-1 to 50-N, ones each having variable filter characteristics may be applied so that, based on information relating to transmission characteristics, such as an error rate or the like, obtained in the receivers 42-1 to 42-N, the filter characteristics of the spectrum correction optical filters corresponding thereto are feedback controlled by control circuits (CONT) 43-1 to 43-N.

Figure 11:
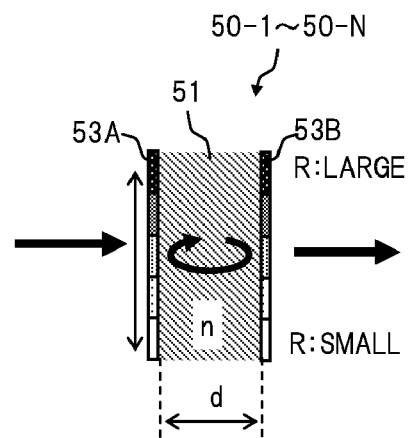
FIG. 11 is a diagram illustrating a configuration example of the spectrum correction optical filter having variable filter characteristics.

FIG. 11 illustrates a configuration example of the spectrum correction optical filter having the variable filter characteristics. In this example, in place of the partial reflective films 52A and 52B of the etalon illustrated in FIG. 2, partial reflective films 53A and 53B each of which reflectivity is distributed are formed on the parallel planes of the flat plate 51. For this etalon, the arrangement thereof is controlled to a distribution direction of the reflectivity by an actuator or the like (not shown in the figure). As a result, a position of the optical signal almost vertically incident on the partial reflective film 53A is controlled, and the reflectivity of the etalon is changed-over according to this incident position, so that the filter characteristics (Finess) of the etalon is changed.

Figure 13:
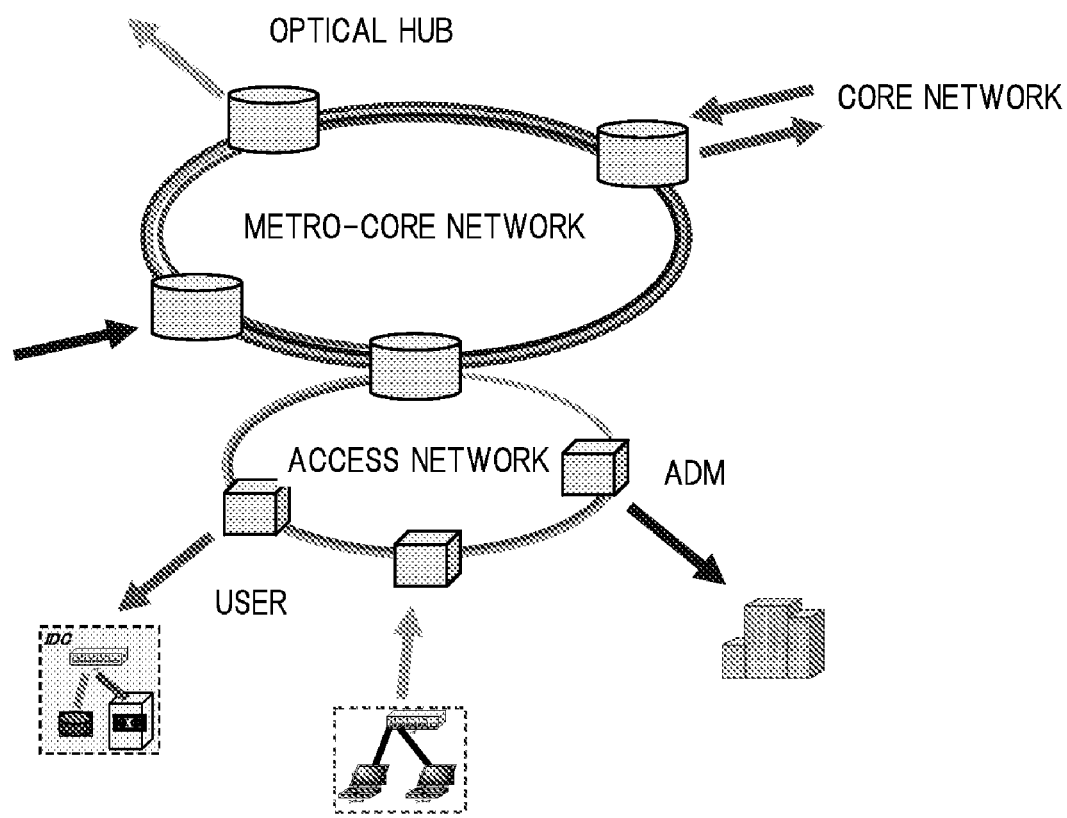
FIG. 13 is a diagram illustrating one example of all optical networks.

As described above, the arrangement of the etalon having the variable filter characteristics is feedback controlled by the control circuits 43-1 to 43-N, based on the information, such as the error rate or the like, from the receivers 42-1 to 42-N, so that, even in the case where a state of the band-limitation to which the optical signal is subjected is changed due to a change in time of the filter characteristics of the band-limiting device 30, it becomes possible to perform the optimum spectrum correction following such a change. This variable control of the filter characteristics of the spectrum correction optical filter is very effective for the case where the present invention is applied to the above optical network as illustrated in FIG. 13, and the number of band-limiting devices through which the optical signals passes is changed in accordance with the changing-over of transmission routes.

Figure 12:
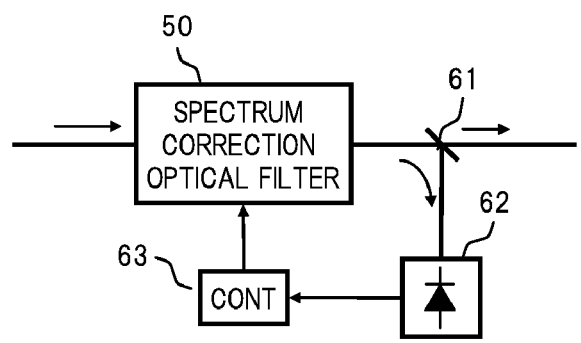
FIG. 12 is a diagram illustrating an application example related to a control of filter characteristics of the spectrum correction optical filter.

Further, related to the control of the filter characteristics of the spectrum correction optical filter, in the present invention, it becomes important that the center wavelength of loss peak in the spectrum correction optical filter is coincident with the center wavelength of the optical signal to be input to the spectrum correction optical filter. Focusing on this point, as illustrated in FIG. 12 for example, the configuration may be such that a part of the output light from the spectrum correction optical filter 50 is branched by a branching device 61, the optical power of the branched light is detected by an optical receiver 62, and the filter characteristics are optimized by controlling the temperature or the like of the spectrum correction optical filter 50 by a control circuit (CONT) 63 so that the detected power becomes minimum. If the center wavelength of loss peak of the spectrum correction optical filter 50 is deviated from the center wavelength of the optical signal, the optical power detected by the optical receiver 62 is increased. Therefore, by controlling the detected power in the optical receiver 62 to become minimum, the center wavelength of loss peak is always coincident with the center wavelength of the optical signal. As a result, it becomes possible to perform the spectrum correction of the optical signal with high precision, and also, to reliably increase the relative intensity of the sideband components in the spectrum of the optical signal.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A transmission method of a WDM light in a WDM optical transmission system in which at least one band-limiting device is arranged on a transmission path through which the WDM light containing a plurality of optical signals of different wavelengths is propagated, and spectrum widths of the optical signals of respective wavelengths are limited when the WDM light passes through the band-limiting device, wherein for the optical signal of each wavelength contained in the WDM light, a spectrum component at a center wavelength thereof and a spectrum component in the vicinity of the center wavelength are selectively attenuated when the optical signal of each wavelength in the WDM light passes through a spectrum correction optical filter, to thereby perform the spectrum correction for increasing relative intensity of sideband components in the spectrum of each optical signal wherein the spectrum correction optical filter has transmission wavelength characteristics having a plurality of loss peaks at which transmittance thereof becomes minimal at wavelengths coincident with the center wavelengths of the respective optical signals.

2. A WDM optical transmission system comprising: a transmission path through which a WDM light containing a plurality of optical signals of different wavelengths is propagated; and at least one band-limiting device arranged on the transmission path, for limiting spectrum width of the optical signal of each wavelengths when the WDM light passes through the band-limiting device, wherein the WDM optical transmission system further comprises a spectrum correction optical filter having transmission wavelength characteristics capable of selectively attenuating a spectrum component at a center wavelength of the optical signal of each wavelength contained in the WDM light and a spectrum component in the vicinity of the center wavelength thereof, and a spectrum correction is performed for increasing relative intensity of sideband components in the spectrum of each optical signal when the optical signal of each wavelength in the WDM light passes through the spectrum correction optical filter, wherein the spectrum correction optical filter has transmission wavelength characteristics having a plurality of loss peaks at which transmittance thereof becomes minimal at wavelengths coincident with the center wavelengths of the respective optical signals.

3. A WDM optical transmission system according to claim 2, wherein for the spectrum correction optical filter, full width at half maximum of each loss peak thereof is broader than a frequency corresponding to a bit rate of each optical signal, and also, is narrower than two times of the frequency.

4. A WDM optical transmission system according to claim 2, wherein the optical signals in the WDM light are allocated at predetermined wavelength spacing, and the spectrum correction optical filter is configured to arrange, on the transmission path, a periodic filter of which transmittance is changed in a period corresponding to the wavelength spacing of the WDM light.

5. A WDM optical transmission system according to claim 4, wherein the periodic filter is an etalon.

6. A WDM optical transmission system according to claim 2, further comprising;

an optical transmission apparatus including: a plurality of transmitters of which output wavelengths are different from each other; and a multiplexer which multiplexes optical signals output from the transmitters, wherein the spectrum correction optical filters are disposed on output ends of the transmitters in the optical transmission apparatus, to perform individually the spectrum correction on the optical signals of respective wavelengths.

7. A WDM optical transmission system according to claim 2, further comprising;

an optical reception apparatus including: a demultiplexer which demultiplexes the WDM light transmitted over the transmission path into the optical signals of respective wavelengths; and a plurality of receivers which reception process the optical signals of respective wavelengths output from the demultiplexer, wherein the spectrum correction optical filters are disposed on input ends of the receivers in the optical reception apparatus, to perform individually the spectrum correction on the optical signals of respective wavelengths.

8. A WDM optical transmission system according to claim 7, wherein each of the spectrum correction optical filter has variable transmission wavelength characteristics, and the WDM optical transmission system further comprises a control section configured to control the transmission wavelength characteristics of each spectrum correction optical filter, based on information relating to transmission characteristics obtained in each receiver.

9. A WDM optical transmission system according to claim 2,
wherein the spectrum correction optical filter has variable transmission wavelength characteristics, and
the WDM optical transmission system further comprises: a power detecting section configured to detect the power of an output light from the spectrum correction optical filter; and a control section configured to control the transmission wavelength characteristics of the spectrum correction optical filter so that the detected power in the power detecting section becomes minimum.

10. A WDM optical transmission system according to claim 2,
wherein when the band-limiting device is arranged, on the transmission path, in plural numbers,
the spectrum correction optical filter is disposed, on the transmission path, in plural numbers corresponding to the respective band-limiting devices.

11. A WDM optical transmission system according to claim 2,
wherein the band-limiting devices includes at least one of a multiplexer which multiplexes the optical signals of respective wavelengths, a demultiplexer which demultiplexes the WDM light and an optical switch to be used for processing of optical adding/dropping or optical cross-connecting.

* * * * *